May 19, 1953
C. HUDSPETH
2,639,121
WHEEL-CHANGING TOOL
Filed Sept. 10, 1951
2 Sheets-Sheet 1
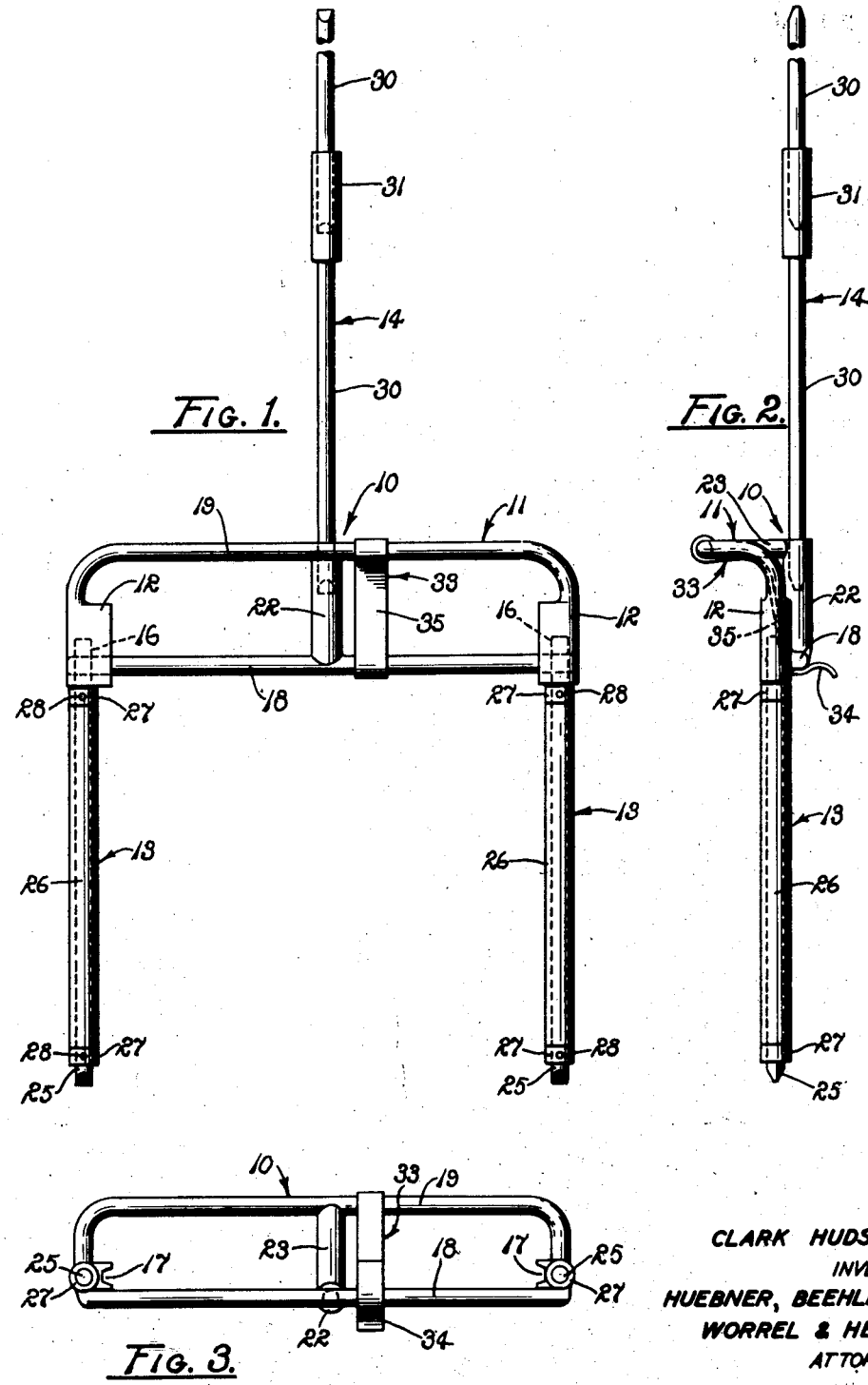
CLARK HUDSPETH
INVENTOR.
HUEBNER, BEEHLER,
WORREL & HERZIG
ATTORNEYS May 19, 1953 C. HUDSPETH 2,639,121
WHEEL-CHANGING TOOL
Filed Sept. 10, 1951 2 Sheets-Sheet 2
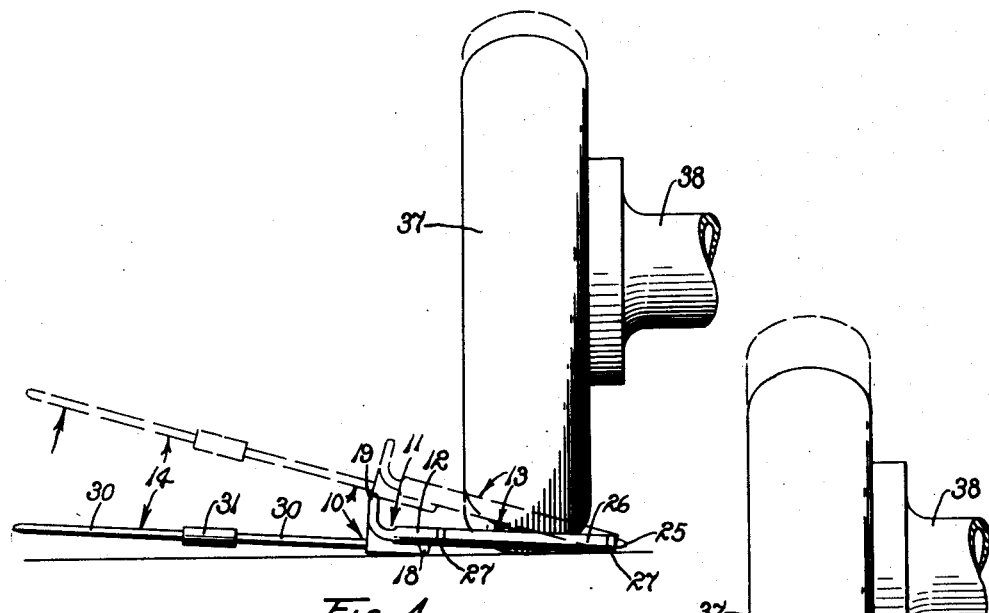
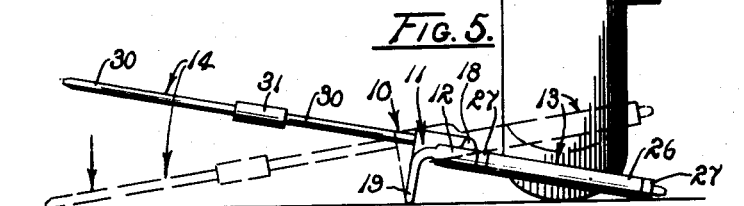
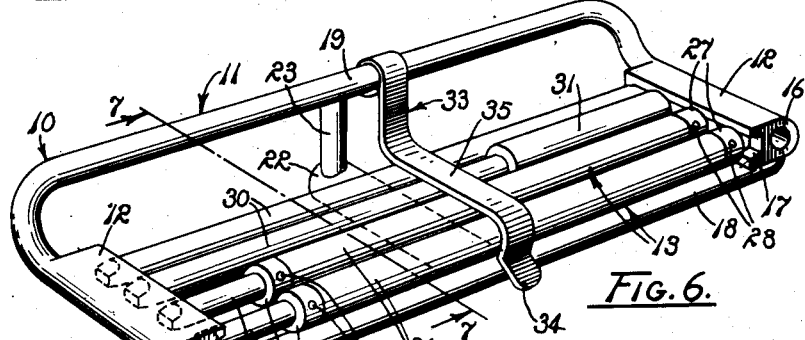
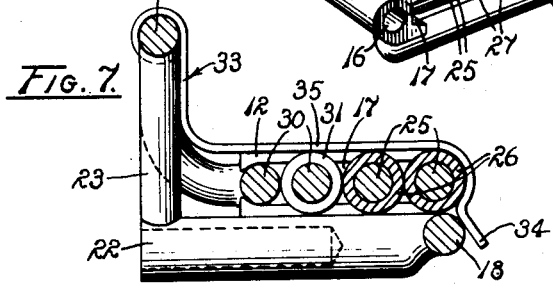
CLARK HUDSPETH
INVENTOR
HUEBNER, BEEHLER,
WORREL & HERZIG
ATTORNEYS Patented May 19, 1953

2,639,121

UNITED STATES PATENT OFFICE 2,639,121

WHEEL-CHANGING TOOL

Clark Hudspeth, Fowler, Calif.

Application September 10, 1951, Serial No. 245,923

5 Claims. (Cl. 254—131)

1

The present invention relates to wheel-changing tools for automotive vehicles and the like and more particularly to a collapsible tool adapted to elevate and adjustably to position wheels, rims, and/or tires rested thereon for mounting convenience.

The problems incident to the elevating and precise positioning of a wheel for mounting on an automotive vehicle are well known. It is usually necessary to align openings in the wheel with screw threaded bores formed in a brake drum or the like so that headed bolts may be inserted through the openings and tightened into the bores or to align bores in the wheel with bolts extended from the brake drum and slidably to fit the wheel thereover. The wheels are cumbersome to handle, difficult to elevate and tedious precisely to position for the insertion of the bolts. Once inserted, the bolts must be at least partially tightened before the wheels are self-supporting. These combined operations are not easily performed even with small wheels and in the mounting of large truck tires and wheels frequently weighing several hundred pounds, the procedure becomes impossible for a single operator.

Inasmuch as many large trucks employ only a single driver, the changing of a tire without assistance is difficult and it has heretofore frequently been found necessary for trucks to remain inoperable under such conditions while assistance is sought. The investment in such trucks makes any period of inoperability not only an inconvenience but a serious expense as well.

An object of the present invention is to provide a tool adapted to elevate and adjustably to position tires, rims, wheels and the like for mounting convenience.

Another object is to provide a wheel-changing tool which is convenient to employ and makes possible the changing of even heavy truck tires and wheels by single, unaided individuals.

Another object is to provide a tool of the character described that is lightweight and that is collapsible for stowage in compact form.

Another object is to provide a wheel-changing tool having selectively employable fulcrums for the varying of the mechanical advantage available to an operator in pivotal manipulation of the tool elevationally to position a tire or the like supported thereon.

Further objects are to provide improved elements and arrangements thereof in a device of the character and for the purposes set forth that is economical to produce, durable in form,

2 and fully effective in accomplishing its intended functions.

Still further objects and advantages will become apparent in the subsequent description in the specification.

In the drawings:

Fig. 1 is a plan view of a tool embodying the principles of the present invention showing a handle portion thereof fore-shortened for illustrative convenience.

Fig. 2 is a side elevation of the tool in the condition shown in Fig. 1.

Fig. 3 is an end elevation of the tool looking toward the lower end of Fig. 1.

Fig. 4 is a side elevation of the tool shown in operable relation to a wheel of an automotive vehicle and a fragmentarily illustrated mounting axle of the vehicle.

Fig. 5 is a view similar to Fig. 4 illustrating an alternate operable attitude of the tool.

Fig. 6 is a somewhat enlarged perspective view of the tool of the present invention shown in collapsed condition for compact stowage.

Fig. 7 is a transverse section of the collapsed tool taken on line 7—7 of Fig. 6.

Referring in greater detail to the drawings:

The tool of the present invention is indicated generally at 10 having a body member 11 including a pair of legs 12, a pair of leg extensions 13 and a handle 14.

The legs 12 of the body member 11 are elongated, have bores 16 formed longitudinally thereof from corresponding ends and provide channels 17 longitudinally thereof from the ends of the legs having the bores which terminate short of the opposite ends of the legs. The legs are arranged in parallel relation with the channels in facing relation in a common plane.

A rigid strut 18 transversely overlays sides of the legs 12 adjacent to the bores 16 and interconnects the legs in fixed spaced relation, as by being welded thereto. A fulcrum bar 19 interconnects the opposite ends of the legs 12 and is extended transversely between the legs in spaced relation to the sides of the legs opposite to the sides thereof on which the strut 18 is mounted. This is accomplished by utilizing a generally U-shaped fulcrum bar. The fulcrum bar is endwardly extended from each of the legs and thence transversely between the legs in substantially parallel spaced relation to the plane of the channels. Like the strut 18, the fulcrum bar may be welded to the legs, secured thereto by any other suitable means, or constructed unitarily therewith. The strut and fulcrum bar dependably locate the legs in parallel relation with the bottoms of the channels 17 in predetermined spaced juxtaposition.

A tubular member 22 is rigidly mounted on the strut 18 and extended therefrom in substantially parallel, equally spaced, relation to the legs 12. A brace 23 rigidly interconnects the extended end of the tubular member and the fulcrum bar 19.

The leg extensions 13 each conveniently consist of an elongated, substantially straight rod 25 having opposite ends individually releasably receivable in the bores 16 of the legs 12 in fitted relation thereto and slidably fitted to the juxtapositioned channels 17 with the rods transversely extended between the legs. A sleeve 26 is fitted in circumscribing relation on each rod and thrust collars 27 mounted on the rods at opposite ends of the sleeves and secured in position by pins 28 in spaced relation to opposite ends of the rods. It will be apparent that the sleeves may be welded or otherwise secured directly to the rods or that the leg extensions may be of unitary construction turned from single rod stock. The channels are preferably transversely cuneiform and the ends of the rods 25 of complementary cuneiform so as to resist rotary motion and jiggling when slidably received in the channels, as will subsequently become apparent.

The tubular member 22 preferably has a cylindrical opening therein of substantially the same diameter as the bores 16. The handle 14 consists of a plurality of segments 30 of rod material slidably fitted to the tubular member 22. The segments have adjacent ends releasably interconnected by a cylindrical coupling 31 rigidly mounted on one of the segments and telescopically receiving an adjacent end of the opposite segment with the segments aligned. Opposite ends of the segments 30 and the extended end of the coupling 31 are preferably cuneiform slidably to be received non-rotatably in the channels 17.

A spring clip 33 is pivotally mounted on the fulcrum bar 19 and substantially right angularly extended therefrom. The clip provides an extended end 34 formed for releasable engagement with the strut 18, as shown in Figs. 2, 6 and 7. The strut provides a central portion 35 in parallel spaced relation to the tubular member 22, for purposes soon to be described.

Operation

The operation and utility of the tool of the present invention is believed to be clearly apparent and is briefly summarized at this point. The tool is normally stowed and carried in the compact form shown in Figs. 6 and 7. The segments 30 of the handle 14 are telescopically disassociated and slidably received in the channel 17 transversely between the legs 12. Similarly, the leg extensions 13 are slidably received in the channels transversely between the legs. It will be observed that the legs and the tubular member define a rack for the nested location of the segments 30 and leg extensions 13 which is closed by thrusting the extended end of the clip 34 into snap engagement with the outer extension 13. The cuneiform of the ends of the leg extensions and segments of the handle preclude rotation thereof in the channels and thus aid in minimizing inadvertent loosening thereof when retained between the clip 34 and the tubular member 22. This shape of the leg ends also facilitates wedging of the legs under tires and/or wheels for elevating convenience.

To employ the tool, the clip 33 is released from engagement with the extension and the handle segments 30 and leg extensions 13 removed from the channels 17 after which the clip is preferably returned to engagement with strut 18 so as to be out of the way during lifting operations.

The rods 25 of the leg extensions 13 are slidably fitted into the bores 16 of the legs 12, as shown in Figs. 1, 2, 4 and 5. The segments 30 of the handle 14 are telescopically interconnected and mounted in the tubular member 22.

As shown in Figs. 4 and 5, in order to elevate a wheel 37 for support, removal or mounting on a vehicle axle indicated at 38, the tool is positioned beneath the wheel with the leg extensions 13 on opposite sides of vertical alignment with the axle. When the side of the body member 11 mounting the strut 18 is downwardly disposed, as shown in Fig. 4, the strut constitutes a fulcrum over which the tool may be pivoted to elevate the wheel 37 to a limited extent but with considerable mechanical advantage. This is accomplished by thrusting downwardly on the extended end of the handle 14. As shown in dashed line, the wheel 37 may also be elevated by lifting upwardly on the extended end of the handle 14 so that the tool is pivoted on the extended ends of the leg extensions 13. Selected pivotal movement of the tool over the strut 18 and extended ends of the leg extensions 13 can also be caused to move the wheel toward or from the axle housing 38 and precisely to elevate the wheel for mounting convenience. Lateral pivotal movement of the handle also can be caused to move the wheel 37 when supported thereon short distances laterally of the tool. It will of course be understood, that while the wheel is supported on the tool, it is preferably supported in a substantially erect position either by the operator of the tool or by inclination thereof against the axle housing 38.

When it is desired to elevate the wheel 37 rested on the tool 10 with less mechanical advantage but increased elevational travel, the tool is slid into wheel elevating position with the fulcrum bar 19 downwardly disposed, as shown in Fig. 5. As indicated in dashed line, the extended end of the handle 14 is thrust downwardly to pivot the tool over the fulcrum bar to elevate the wheel 37. In actual practice this is frequently done by an operator thrusting downwardly on the handle with his foot, leaving his hands free to secure mounting bolts, not shown, adapted to hold the wheel 37 in place on the axle housing.

Even a novice is able to employ the tool of the present invention precisely to position wheels and the like for mounting purposes as well as to lower such wheels from their mounted position during removal thereof from an automotive vehicle or the like. The tool makes possible the mounting and removal of even exceedingly heavy tires and wheels from trucks, aircraft, and the like by single, unaided individuals and substantially facilitates mounting and removal of relatively light-weight tires and wheels as utilized on passenger cars.

The device is collapsible for compact stowage, speedily and easily assembled for use and fully effective in accomplishing its intended purpose.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A collapsible wheel-changing tool comprising a body member having a pair of substantially parallel legs having endwardly disposed bores and defining a receiving rack therebetween, a pair of leg extensions releasably receivable in the bores of the legs, a handle releasably mountable in the body member, said handle and leg extensions being receivable by the rack in nested relation, and means for releasably retaining the handle and the leg extensions in the rack.

2. In a collapsible wheel-changing tool, the combination of a body member having substantially flat opposite sides and a pair of substantially parallel legs having endwardly disposed bores and laterally disposed channels in facing relation, a pair of leg extensions releasably receivable in the bores of the legs and in the channels, and a collapsible handle releasably mountable on the body member in a position oppositely extended therefrom from the leg extensions and releasably receivable in the channels when collapsed, the body member providing a fulcrum means adjacent to the leg extensions on one side thereof and a second fulcrum means at the opposite side in spaced relation to the leg extensions.

3. A collapsible wheel-changing tool comprising a body member having a pair of elongated substantially parallel legs formed with longitudinal bores and longitudinal channels therein in facing relation having corresponding open and closed end portions, and a strut interconnecting the legs in fixed spaced relation adjacent to the ends thereof corresponding to the open ends of the channels, said strut transversely overlapping the legs at corresponding sides thereof, a fulcrum bar interconnecting the ends of the legs corresponding to the closed ends of the channel in fixed spaced relation, said fulcrum bar being laterally offset from the legs to the side thereof opposite to the strut, and a socket member interconnecting the strut and the fulcrum bar intermediate the legs having a bore therein axially in substantially right angular relation to the strut; a pair of elongated leg extensions telescopically receivable in the bores of the legs and of a common length receivable transversely between the legs with opposite ends thereof slidably received in the channels; a handle releasably receivable in the bore of the socket member having a plurality of telescopically interconnected segments of a common length receivable transversely between the legs with opposite ends thereof slidably received in the channels; and a spring clip pivotally mounted on the fulcrum bar and releasably engageable with the strut with a central portion thereof in substantially parallel spaced relation to the socket member.

4. A collapsible wheel-changing tool comprising a body member of unitary construction having a pair of elongated substantially parallel legs having bores formed inwardly from corresponding ends thereof and providing facing longitudinal channels in a common plane extended from the ends of the legs in which the bores are formed longitudinally of their respective legs to positions short of the opposite ends of the legs, a strut transversely overlapping the legs adjacent to the ends thereof in which the bores are formed and interconnecting the legs with the channels thereof in fixed spaced relation, a fulcrum bar endwardly extended from the ends of the legs opposite to the bores and thence transversely between the legs in substantially parallel spaced relation to the plane of the channels to the side of the legs opposite to the strut, a tubular member rigidly mounted on the strut and extended therefrom in parallel relation to the legs substantially midway therebetween, and a brace rigidly interconnecting the extended end of the tubular member and the fulcrum bar; a pair of leg extensions having an elongated rod of a length substantially equal to the spacing of the bottoms of the channels telescopically fitted to the bores of the legs and slidably receivable transversely between the legs in the channels, a sleeve of a length substantially equal to the spacing of the legs fitted in circumscribing relation on the rod, and means mounting the sleeve on the rod with opposite ends thereof in spaced relation to corresponding opposite ends of the rod; a handle telescopically fitted into the tubular member of the body member having a plurality of releasably endwardly connected elongated segments of lengths substantially equal to the spacing of the bottoms of the channels each having opposite ends slidably receivable in the channels with the segments transversely positioned between the legs; and a spring clip pivotally mounted on the fulcrum bar having an extended end releasably engageable with the strut and a central portion in substantially parallel spaced relation to the tubular member when the extended end is engaged with the strut.

5. A collapsible wheel and tire changing tool comprising a body member having a pair of substantially parallel legs having endwardly disposed bores and defining a receiving rack therebetween, a pair of leg extensions releasably receivable in the bores of the legs and in the rack transversely between the legs, and a handle releasably mountable on the body member in a position oppositely directed from the extensions when the extensions are received in the bores and releasably receivable in the rack transversely between the legs.

CLARK HUDSPETH.

References Cited in the file of this patent

UNITED STATES PATENTS

| Number | Name | Date |
|---|---|---|
| 1,920,350 | Bourdon | Aug. 1, 1933 |
| 2,212,716 | Noble et al. | Aug. 27, 1940 |

FOREIGN PATENTS

| Number | Country | Date |
|---|---|---|
| 379,029 | Germany | Aug. 15, 1922 |